(12) United States Patent
Tachigori

(10) Patent No.: US 6,403,948 B1
(45) Date of Patent: Jun. 11, 2002

(54) PHOTO-DETECTING MODULE HAVING A FIBER OPTIC GROOVE ON REAR SURFACE OF INTEGRATED CIRCUIT DEVICE

(75) Inventor: Masashi Tachigori, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/472,873

(22) Filed: Dec. 28, 1999

(30) Foreign Application Priority Data

Dec. 28, 1998 (JP) ............................. 10-374501

(51) Int. Cl.[7] ............................. G01J 1/04; G02B 6/36
(52) U.S. Cl. ................................ 250/227.11; 385/88
(58) Field of Search ........................ 250/227.11, 227.24; 385/88, 91; 359/195; 257/778

(56) References Cited

U.S. PATENT DOCUMENTS 5,502,785 A * 3/1996 Wang et al. ............... 385/92
5,675,684 A * 10/1997 Hirataka et al. ............ 385/88
5,784,509 A * 7/1998 Yamane et al. ............. 385/49
6,217,232 B1 * 4/2001 Duesman et al. ........... 385/88
6,285,043 B1 * 9/2001 Yap ............................ 257/81

FOREIGN PATENT DOCUMENTS

| JP | 8-8818 | 1/1996 |
| JP | 8-78657 | 3/1996 |
| JP | 10-56163 | 2/1998 |

* cited by examiner

Primary Examiner—Seungsook Ham
Assistant Examiner—Christopher Glass
(74) Attorney, Agent, or Firm—Young & Thompson

(57) ABSTRACT

On a module substrate on which a wiring pattern is formed, an integrated circuit device is mounted via solder bumps so that the front surface thereof faces the module substrate. An optical fiber is seated within a groove formed on the rear surface of the integrated circuit device. Additionally, a photo-detecting device is mounted on the module substrate for receiving light transmitted through the optical fiber. This allows the photo-detecting module to reduce the number of mounted parts and to be fabricated in less time.

7 Claims, 5 Drawing Sheets

PHOTO-DETECTING
DEVICE
(LIGHT-INCIDENT SIDE)

PHOTO-DETECTING
DEVICE
(ELECTRODE SIDE)

PHOTO-DETECTING MODULE HAVING A FIBER OPTIC GROOVE ON REAR SURFACE OF INTEGRATED CIRCUIT DEVICE

BACKGROUND OF THE INVENTION

1. Field of the Invention

The present invention relates to a photo-detecting module for use as an optical receiver in an optical transmission system.

2. Description of the Related Art

The photo-detecting module comprises such components as a photo-detecting device for converting received optical signals into electric signals, and an integrated circuit device having a pre-amplifier for extracting the electric signal from the photo-detecting device and the like. As shown in FIG. 1, a prior art photo-detecting module employs separate silicon substrates for the components. Referring to the figure, reference numeral 26 denotes a silicon substrate, 27 a photo-detecting device, 28 an integrated circuit device, and 29 bonding wires.

For this reason, when these components constitute a circuit-built-in module, separate rooms are required for respective components as shown in FIG. 1. In addition, in typical cases, bonding wires are used for connecting an optical segment to an integrated circuit device segment and for connecting the integrated circuit device to the package. The bonding wires are required to be equal to or more than 1 mm in length to provide a room for mounting, thus presenting a problem of inducing deterioration in high-frequency property.

SUMMARY OF THE INVENTION

An object of the present invention is to provide a photo-detecting module that allows the number of mounted parts to be reduced and the time for fabrication to be reduced by using the rear surface of a semiconductor integrated circuit device as a member for seating an optical fiber. Another object is to provide a photo-detecting module that is given an improved high-frequency property by flip-chip mounting a semiconductor integrated circuit device via solder bumps and thus eliminating the need for respective connections to the photo-detecting device using bonding wires.

The photo-detecting module according to the present invention comprises a module substrate on which a wiring pattern is formed. An integrated circuit device is mounted on said module substrate via solder bumps so that the front surface thereof where an integrated circuit is provided faces said module substrate. Said integrated circuit device has a groove on the rear surface thereof. An optical fiber is seated within said groove formed on the rear surface of said integrated circuit device. A photo-detecting device is mounted on said module substrate for receiving light transmitted through said optical fiber.

Said integrated circuit device and photo-detecting device may be mounted on a block that is used for positioning those in the direction of height.

Furthermore, said groove may be formed in the shape of letter V. Also, an optical fiber retainer may hold said optical fiber by sandwiching said optical fiber with said integrated circuit device.

According to the present invention, the optical fiber is seated within an optical fiber seat groove provided on the integrated circuit device, and the semiconductor integrated circuit device is flip-chip mounted on the module substrate via solder bumps. Moreover, the photo-detecting device and the semiconductor integrated circuit device are connected to each other by means of a wiring pattern provided on the module substrate. Such use of the rear surface of the semiconductor integrated circuit device as an optical fiber seat member allows the number of mounted parts to be reduced and the time for fabrication to be reduced. In addition, flip-chip mounting of the semiconductor integrated circuit device via solder bumps eliminates the need for respective connections to the photo-detecting device using bonding wires, thus also enabling providing an improved high-frequency property.

DETAILED DESCRIPTION OF THE PREFERRED EMBODIMENTS

Figure 1:
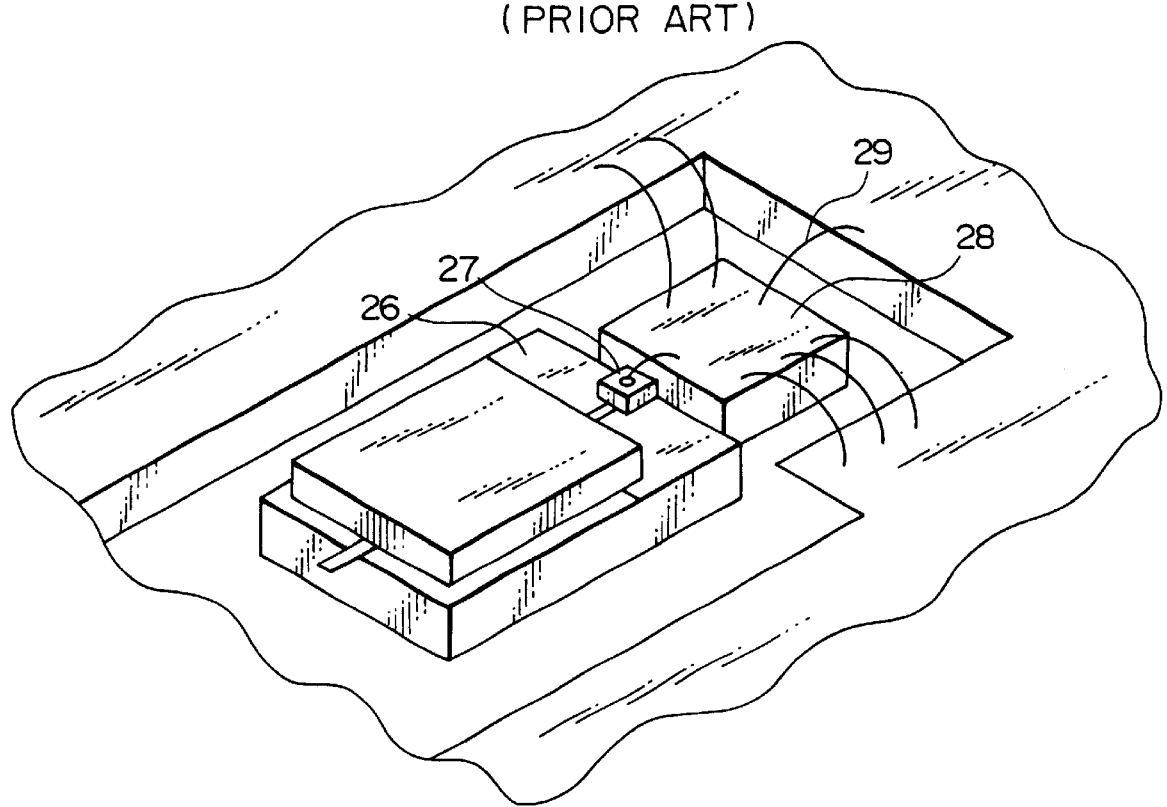
FIG. 1 is a view showing a prior art photo-detecting module.
Figure 2:
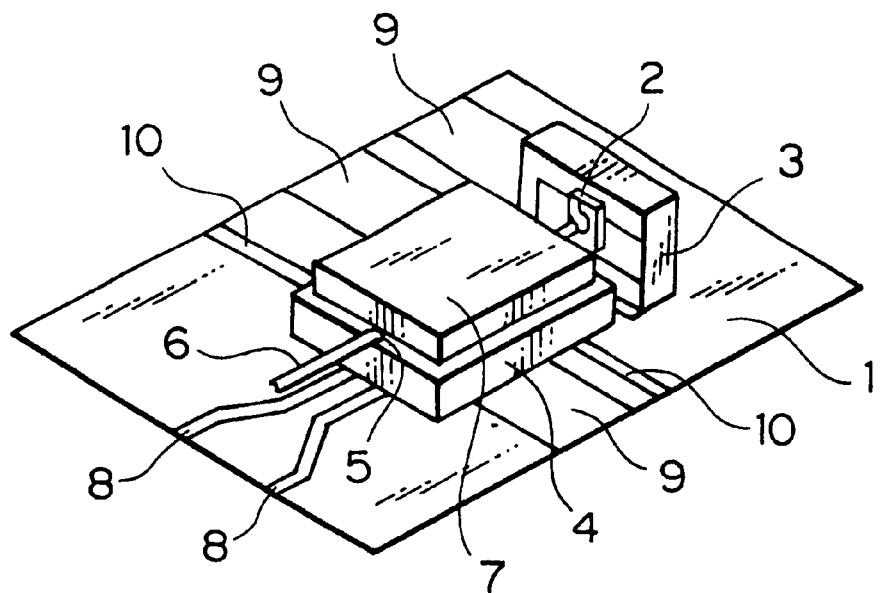
FIG. 2 is a view showing a photo-detecting module according to an embodiment of the present invention.

FIG. 2 shows a photo-detecting module according to an embodiment of the present invention.

On a module substrate 1, there are mounted a carrier 3 on which a photo-detecting device 2 is mounted, and a semiconductor integrated circuit device 4. There is formed an optical fiber seat groove 5 on the semiconductor integrated circuit device 4. An optical fiber 6 is seated within the optical fiber seat groove 5 and is sandwiched by an optical fiber retainer 7 to be held therebetween. On the module substrate 1, there are provided electrode patterns such as a signal wire 8 for fixing the semiconductor integrated circuit device 4 for electrical connection, power/GND wires 9, and control terminal wires 10.

Figure 3:
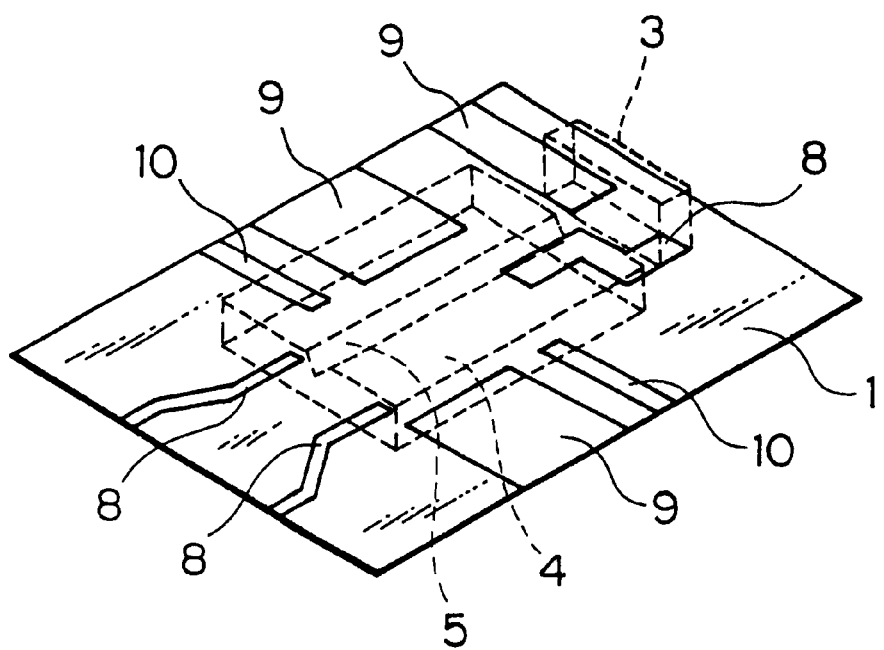
FIG. 3 is a view showing a wiring pattern on the module substrate of the photo-detecting module of FIG. 2.

FIG. 3 is a view showing the carrier 3 and the semiconductor integrated circuit device 4 which are indicated by dashed lines and of which wiring patterns extend to the lower portions where the carrier 3 and semiconductor integrated circuit device 4 are mounted. FIG. 2 is a view showing the core portion of the photo-detecting module of the present invention, and no particular limitation is given to the structure and configuration of other surrounding portions.

Now, respective components are explained.

Figure 4A:
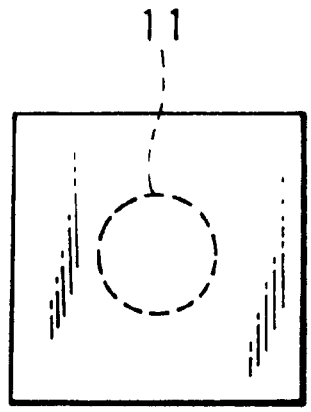
FIG. 4A is a view showing the light-incident side of a photo-detecting device for use in the photo-detecting module of FIG. 2.
Figure 4B:
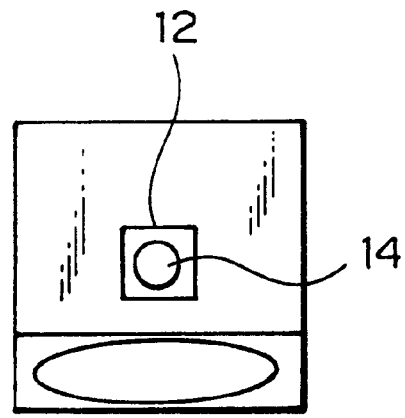
FIG. 4B is a view showing the side of the electrode thereof.

FIGS. 4A and 4B show the pattern of the photo-detecting device 2. A photo-detecting device of a rear-incident type is taken as an example. FIG. 4A shows a light-incident side and FIG. 4B shows an electrode side. The light emitted from the optical fiber 6 is allowed to be incident on the light-incident region 11 shown in FIG. 4A. Photocurrent is outputted from a p electrode 12 shown in FIG. 4B. A solder bump 14 is provided on both p and n electrodes to fixedly mount the photo-detecting device 2 on the carrier 3.

Figure 5:
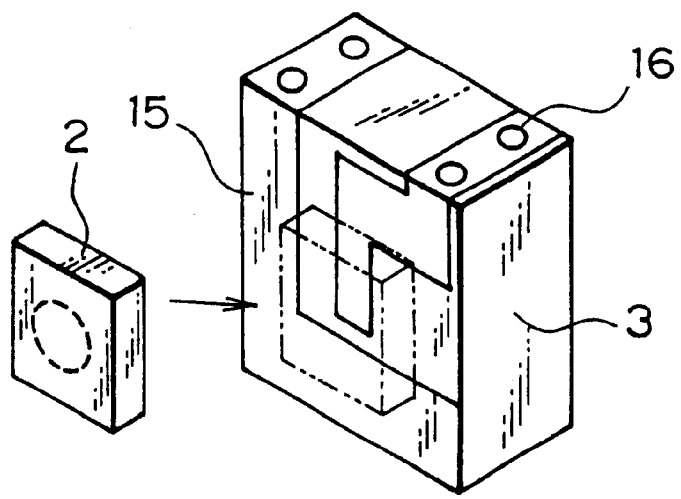
FIG. 5 is a detailed view showing a carrier of the photo-detecting device for use in the photo-detecting module of FIG. 2.

FIG. 5 shows the carrier 3 in detail.

The photo-detecting device 2 is provided, on the mount surface thereof, with an electrode 15 located to the photo-detecting device 2, and is fixed via the solder bump. The electrode 15 is bent to extend to an edge face. On the electrodes of the edge face, there are provided solder bumps 16 for connecting to the module substrate 1. The photo-detecting device 2 is fixedly positioned with high accuracy to the carrier 3 so as to be coupled to the light emitted from the optical fiber 6 in an optimal manner when a photo-detecting device 2 is assembled with the carrier 3 into a module.

Figure 6:
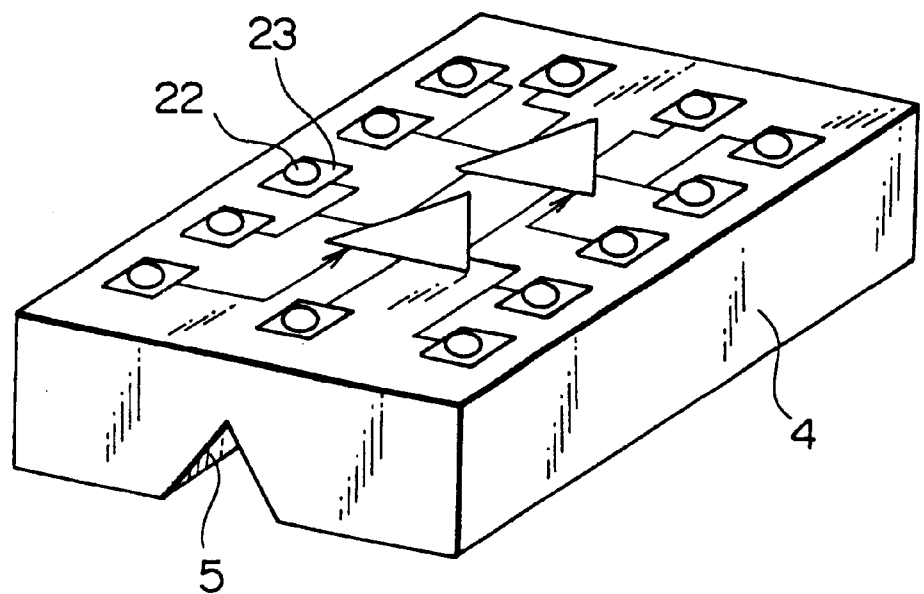
FIG. 6 is a view showing an integrated circuit device for use in the photo-detecting module of FIG. 2, and an optical fiber seat groove formed on the back thereof.

FIG. 6 shows the semiconductor integrated circuit device 4 on which the optical fiber seat groove 5 is formed that characterizes the present invention. An integrated circuit device composed of silicon is taken as an example here for explanation.

Silicon substrates are employed as material for use in many integrated circuit devices. Taking advantage of the anisotropic etching property of silicon, the silicon substrate is applied to the. highly accurate V-shaped groove substrate for seating an optical fiber. Therefore, a silicon-based semiconductor integrated circuit device is also used as an optical fiber seat substrate.

First, a pattern for forming the V-shaped groove is formed on the rear side of a silicon substrate that has gone through the steps of an integrated circuit device.

Next, an etching passivation film is formed on the side of integrated circuit device and then a V-shaped groove that is employed as an optical fiber seat groove is formed by etching. After the formation of the V-shaped groove, the etching passivation film is removed to allow solder bumps 22 to be formed on pad electrodes 23.

The use of the V-shaped groove allows the optical fiber to be held at three points on the circumference thereof by means of said V-shaped groove and an optical fiber retainer, thereby positively securing the optical fiber.

Although the above explanation was made taking silicon as an example, the present invention is not intended to specify materials or formation method as the requirements for the configuration thereof so long as the integrated circuit device has an optical fiber seat groove formed.

Figure 7:
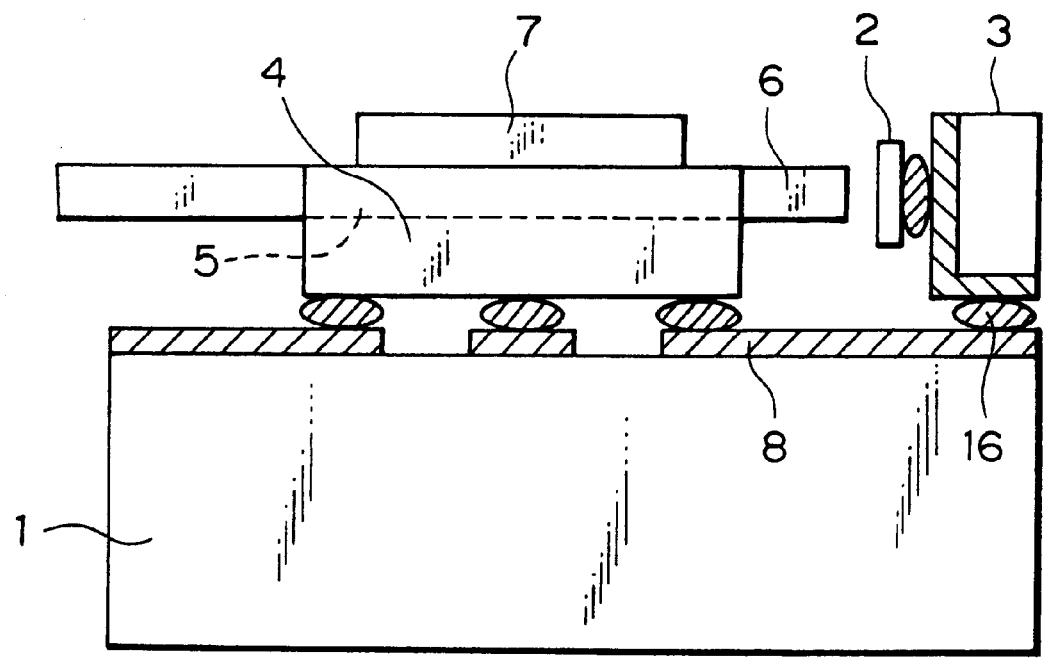
FIG. 7 is a cross-sectional view showing the photo-detecting module of FIG. 2.

FIG. 7 is a cross-sectional view showing a photo-detecting module of the present invention. The carrier 3, on which the photo-detecting device 2 is mounted, and the optical fiber 6 are mechanically positioned with each other and fixed by a passive alignment mounting technique without optical alignment so as to provide optimal optical properties. The respective electrodes of the module substrate 1, the photo-detecting device 2, and the semiconductor integrated circuit device 4 are electrically connected to each other via solder bumps that are formed respectively. In this embodiment, the accuracy in the direction of height depends on that of the solder bumps formed, respectively, which is of the order of a few micrometers.

Figure 8:
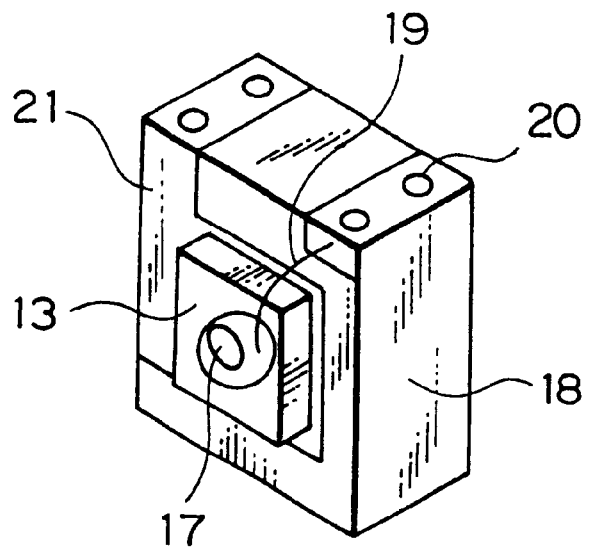
FIG. 8 is a detailed view showing the photo-detecting device of a front-incident type for use in the photo-detecting module of the present invention.

FIG. 8 shows the case where a photo-detecting device 13 of a front-incident type is employed. Like in FIG. 5, an electrode 21 is formed on the mount surface of the photo-detecting device 13 and on the edge face thereof as well, and solder bumps 20 for connecting to the module substrate 1 are formed on the edge face. The difference from FIG. 5 is that a bonding wire 19 is employed for electrical connection.

In this embodiment, a single bonding wire is employed to extract signals from the photo-detecting device. However, the bonding wire is only 100 to 200μm in length and deterioration in high-frequency property of this portion is therefore not appreciable, thus never departing from the feature of the present invention.

Figure 9:
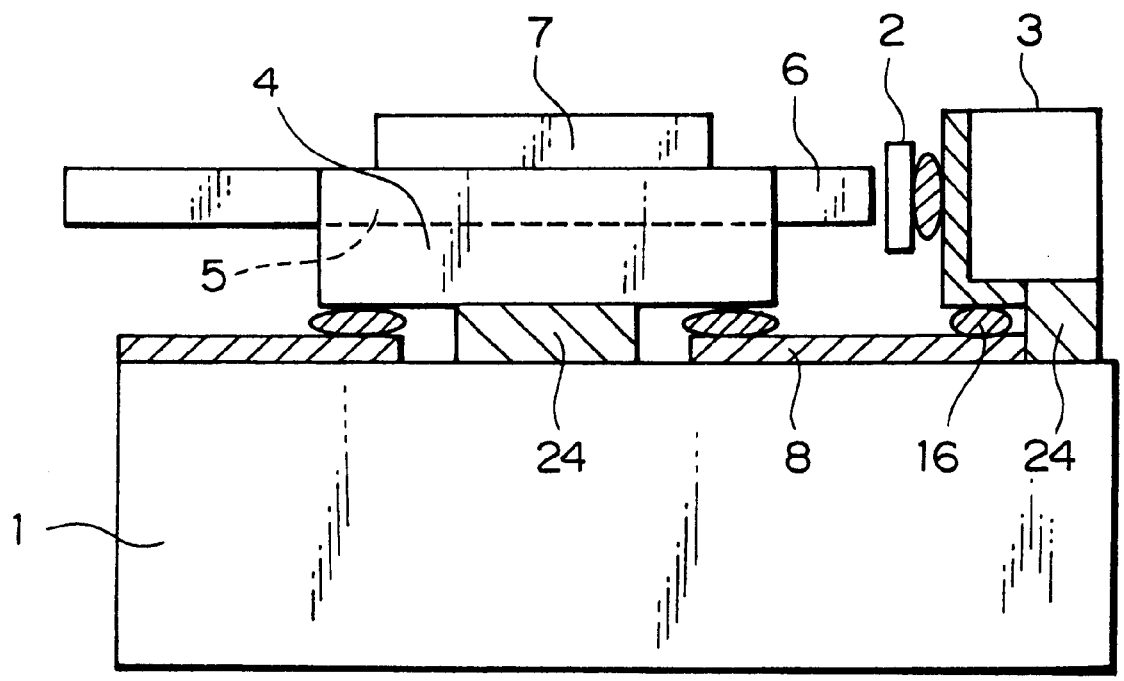
FIG. 9 is a cross-sectional view showing a photo-detecting module according to another embodiment of the present invention.

An embodiment shown in FIG. 9 is a mounting structure for providing an improved accuracy in the direction of height. A projecting block 24 is disposed for positioning in the direction of height, and the carrier 3 and the semiconductor integrated circuit device 4 are fixedly mounted by being brought into contact therewith. This configuration provides mounting accuracy of the order of sub-micrometer in the direction of height.

What is claimed is:

1. A photo-detecting module comprising:
    a module substrate on which a wiring pattern is formed,
    an integrated circuit device mounted on said module substrate via solder bumps so that a front surface thereof where an integrated circuit is provided faces said module substrate, said integrated circuit device having a groove on a rear surface thereof,
    an optical fiber seated within said groove formed on said rear surface of said integrated circuit device, and
    a photo-detecting device, mounted on said module substrate, for receiving light transmitted through said optical fiber.

2. The photo-detecting module according to claim 1, wherein said integrated circuit device and photo-detecting device are mounted on a block which is used for positioning in the direction of height.

3. The photo-detecting module according to claim 1, comprising an optical fiber retainer holding said optical fiber by sandwiching said optical fiber with said integrated circuit device.

4. The photo-detecting module according to claim 1, wherein said groove is formed in a shape of letter V.

5. The photo-detecting module according to claim 2, wherein said groove is formed in a shape of letter V.

6. The photo-detecting module according to claim 3, wherein said groove is formed in a shape of letter V.

7. A photo-detection module, comprising:
    a substrate having a wiring pattern on a first surface thereof;
    an integrated circuit device mounted on said first surface of said substrate, said integrated circuit device having a circuit on a front surface that faces said first surface and a groove in a rear surface opposite said front surface;
    an optical fiber seated in said groove; and
    a photodetector mounted on said first surface of said substrate so as to receive light from said optical fiber, said photodetector being electrically connected to said integrated circuit device through a part of said wiring pattern on said first surface of said substrate.

\* \* \* \* \*